United States Patent
Murakami et al.

(10) Patent No.: US 7,328,594 B2
(45) Date of Patent: Feb. 12, 2008

(54) PROCESSES FOR THE PRODUCTION OF GLASS ARTICLE

(75) Inventors: Akira Murakami, Tokyo (JP); Katsumi Utsugi, Tokyo (JP); Yoshinori Iguchi, Tokyo (JP); Masahiro Yoshida, Hidaka (JP); Yoshikane Shinkuma, Tokyo (JP); Atsushi Watabe, Tokyo (JP)

(73) Assignee: Hoya Corporation, Tokyo (JP)

( * ) Notice: Subject to any disclaimer, the term of this patent is extended or adjusted under 35 U.S.C. 154(b) by 227 days.

(21) Appl. No.: 10/317,854

(22) Filed: Dec. 12, 2002

(65) Prior Publication Data

US 2003/0131628 A1    Jul. 17, 2003

(30) Foreign Application Priority Data

Dec. 14, 2001  (JP)  ............................. 2001-381292
May 29, 2002  (JP)  ............................. 2002-155065

(51) Int. Cl.
*C03B 19/10*  (2006.01)
*C04B 35/14*  (2006.01)

(52) U.S. Cl. ............................. 65/21.2; 65/21.3; 65/65; 65/66

(58) Field of Classification Search ............... 65/21.2, 65/21.5, 64, 32.5, 66, 116, 126, 137, 142, 65/21.3; 264/5, 13, 14
See application file for complete search history.

(56) References Cited

U.S. PATENT DOCUMENTS 5,087,279 A * 2/1992 Monji et al. .................. 65/64
5,192,352 A * 3/1993 Kuwabara et al. ......... 65/60.53
5,762,673 A   6/1998 Hirota et al.

FOREIGN PATENT DOCUMENTS

| GB | 1115174 A | * | 5/1968 |
| JP | 02-014839 | | 1/1990 |
| JP | 03223122 A | * | 10/1991 |
| JP | 07-041328 | | 2/1995 |
| JP | 07041328 A | * | 2/1995 |
| JP | 10-291824 | | 11/1998 |
| JP | 10291824 A | * | 11/1998 |
| SU | 530854 | | 10/1976 |

OTHER PUBLICATIONS

Machine translation of JP 10-291824 retrieved from http://www19.ipdl.ncipi.go.jp/PA1/cgi-bin/PA1INIT?1102431898753 on Apr. 25, 2005.*

* cited by examiner

*Primary Examiner*—Carlos Lopez
(74) *Attorney, Agent, or Firm*—Nixon & Vanderhye P.C.

(57) ABSTRACT

A process for stably and efficiently producing quality glass articles such as preforms at high yields, and a process for producing an optical device from the preform obtained by the above process. In the process for producing a glass article, molten glass gobs having a predetermined weight each are poured, or molten glass drops having a predetermined weight each are dropped through a nozzle, into a boiling liquid having a boiling point lower than the class transition temperature of the glass constituting said glass article or a liquid which is temperature-adjusted beforehand so as to be caused to boil by the amount of heat of the glass, to form glass articles.

11 Claims, 7 Drawing Sheets

(1)

(2)

(3)

PROCESSES FOR THE PRODUCTION OF GLASS ARTICLE

DETAILED DESCRIPTION OF THE INVENTION

1. Field of the Invention

The present invention relates to a process for the production of a glass article and a process for the production of an optical device. More specifically, it relates to a process for efficiently and stably producing a glass article such as a preform for press molding from a molten glass gob or a molten glass controlled to have a predetermined weight or producing a glass article from a glass in a softened state, and a process for the production of an optical device from the above preform.

2. Prior Art

There is known a method in which a plurality of molds consecutively receive a predetermined amount of molten glass from a flow nozzle through which molten glass is continuously dropped, the molten glasses are formed in the form of a sphere or some other form, and the thus-obtained glass articles are used as preforms for press molding, such as preforms for mold optics molding (e.g., see JP-A-2-14839). The above method has characteristic features that it has high efficiency in production since preforms can be produced directly from molten glass, that preforms can be enhanced in weight accuracy and that preforms having a clean and smooth surface can be obtained.

However, the above method involves the necessity of transporting a mold into, and out of, a molten-glass-reception position timely as predetermined, and there is required a large-scale means of transporting molds therefor. Further, there is also optionally required a floating gas supply means for floating glass above molds. Furthermore, it is required to control the timing of transporting molds in, and out of, the predetermined position timely at intervals at which molten glass is dropped, and that the transportation may not be followed by a general mold transporting means if the each interval at which glass is dropped decreases.

3. Problems to be Solved the Invention

Under the circumstances, it is an object of the present invention to provide a process for stably and efficiently producing high-quality glass articles such as preforms with enhanced productivity.

4. Means to Solve the Problems

The present inventors have made diligent studies and consequently found that the above object can be achieved by putting or dropping a molten glass gob or molten glass controlled to have a predetermined weight, into a boiling liquid having a boiling point lower than the glass transition temperature of said glass or a liquid that is caused to boil by an amount of heat of the glass, to form glass articles, or by forming a glass in a softened state and cooling glass articles in a boiling liquid or a liquid that is caused to boil by an amount of heat of the glass, and on the basis of the above finding, the present invention has been completed.

That is, the present invention provides;

(1) a process for the production of a glass article from a molten glass, which comprises putting a molten glass gob formed of a predetermined amount of molten glass having a predetermined weight taken from a molten glass, into a boiling liquid having a boiling point lower than the glass transition temperature of the glass constituting said glass article or a liquid which is temperature-adjusted beforehand so as to be caused to boil by the amount of heat of the glass, to form a glass article having a weight equivalent to said weight, and taking out the glass article, (2) a process for the production of a glass molded article from a molten glass, which comprises putting a molten glass gob formed of a molten glass that is taken from a molten glass and has a predetermined weight, into a liquid that is caused to boil by the amount of heat of the glass, to form a glass article having a weight equivalent to said weight, and taking out said glass molded article while the liquid in contact with the glass article is boiling, (3) a process for the production of a glass article as recited in the above (1) or (2), wherein a forward end portion of flow of the molten glass flowing out from a nozzle is received on a support member, then, the molten glass is cut or separated between the nozzle and the support member, to take the molten glass having a predetermined weight, and the molten glass gob is formed from the molten glass taken, (4) a process for the production of a glass article from a molten glass by dropping a molten glass, which comprises dropping a molten glass having a predetermined weight in a boiling liquid having a boiling point lower than the glass transition temperature of the glass constituting said glass article or a liquid controlled in advance to be caused to boil by the amount of heat of the glass, from a nozzle, to form a glass article having a weight equivalent to said weight, and taking out the glass article, (5) a process for the production of a glass article by dropping a molten glass, which comprises dropping a molten glass having a predetermined weight into a liquid that is caused to boil by the amount of heat of the glass, from a nozzle, to form a glass article having a weight equivalent to said weight, and taking out said glass article while the liquid in contact with the glass article is boiling, (6) a process for the production of a glass article by forming a glass in a softened state, which comprises cooling said glass article in a boiling liquid or a liquid that is caused to boil by the amount of heat of the glass, (7) a process for the production of a glass article as recited in any one of the above (1) to (5), wherein the glass article is a preform for press-molding, (8) a process for the production of a press-molding preform by dropping molten glass, which comprises dropping a molten glass having a predetermined weight from a nozzle, receiving the dropped glass with a liquefied medium obtained by cooling and liquefying a substance that exhibits a gaseous phase state at room temperature under atmospheric pressure, to form a preform having a weight equivalent to said weight, and taking out the preform, (9) a process for the production of an optical device, which comprises, heating, softening and press-molding a preform prepared by the process recited in the above (7) or (8), and

(10) a process for the production of an optical device as recited in the above (9), wherein a press-molded glass is lapped and polished.

PREFERRED EMBODIMENTS OF THE INVENTION

In the process for the production of a glass article, provided by the present invention, a molten glass controlled to have a predetermined weight or a molten glass gob formed of a molten glass controlled to have a predetermined weight is dropped or put into a boiling liquid having a boiling point lower than the glass transition temperature of the glass constituting the above glass article or a liquid whose temperature is controlled beforehand to boil on the basis of the amount of heat of the glass, and a cooled and formed glass article (to be sometimes referred to as "glass element" hereinafter) having a weight equivalent to the weight before the above dropping or putting, is taken out. The above "boiling on the basis of the amount of heat of the glass" includes not only a case where the entire liquid boils but also a case where the liquid in contact with glass that has been dropped or put thereinto boils. The above temperature control includes a method in which the liquid is heated or a method in which molten glass gobs are repeatedly dropped or put and the intervals of dropping or putting are determined so that the liquid is caused to boil by the amount of heat of the glass that has been dropped or put into the liquid.

The mode of practice of the process for the production of the above glass article will be explained in detail with reference attached drawings in the order of the outline of forming the glass article, the weight accuracy of molten glass, dropping or putting of molten glass into the liquid to form the glass, the taking out of glass articles and glass to be used for the glass article.

<Outline of Forming Glass Article>

Figure 1:
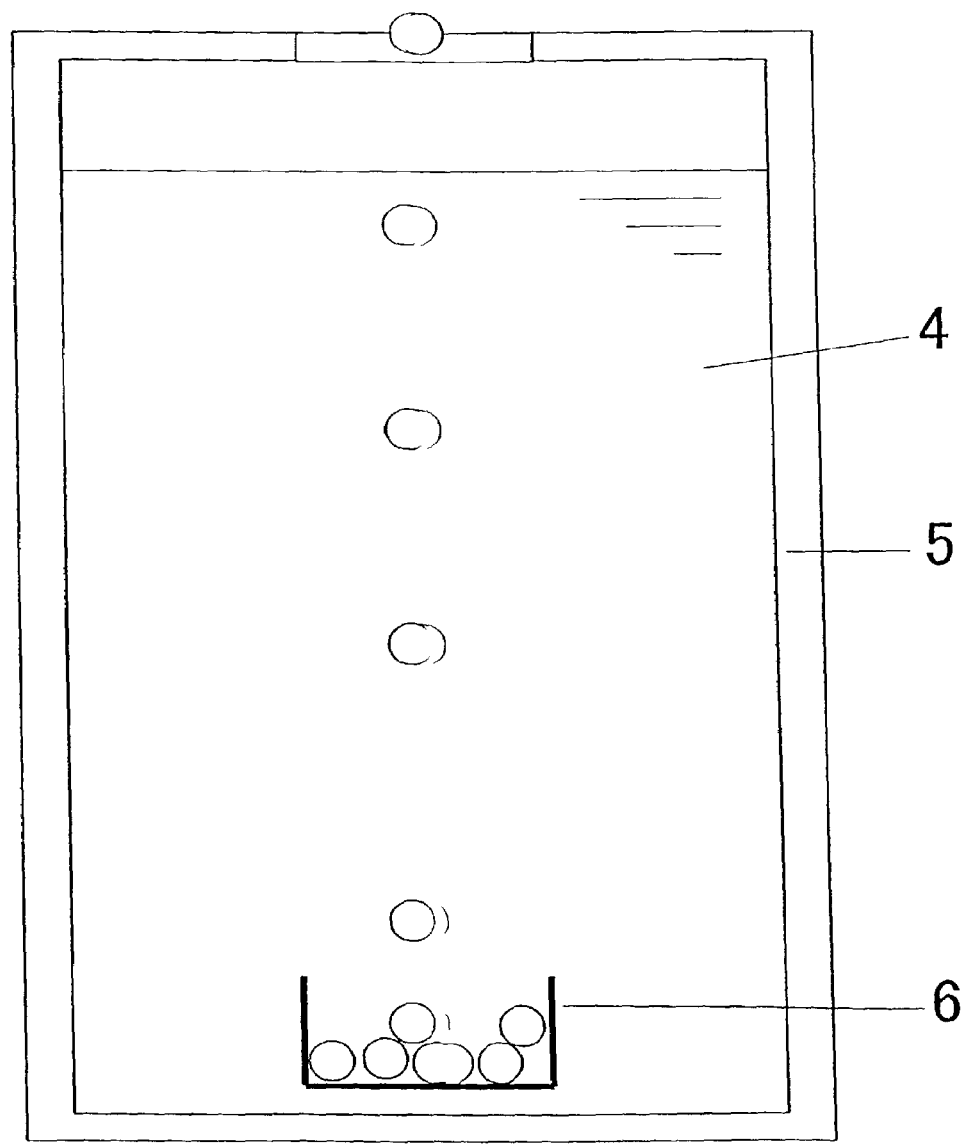
FIG. 1 is a schematic drawing of one example of a glass forming apparatus for use in the process of the present invention.

FIG. 1 is a schematic drawing of one example of a glass forming apparatus. The apparatus shown in FIG. 1 has a molten glass supply unit 1 and a melting furnace (not shown) containing molten glass as a glass material and positioned above the molten glass supply unit 1. Molten glass is continuously feed to the molten glass supply unit 1 from the above furnace, and glass is dropped or continuously flowed out from an outlet port 2 (to be referred to as "nozzle" hereinafter) provided in the forward end portion of the molten glass supply unit 1. For stabilizing the weight accuracy of the glass, the glass is temperature-controlled so that glass flowing in the glass supply unit 1 always has a constant flow rate. The method of controlling the glass weight includes several methods (largely, dropping and cutting methods), and, for example, in the apparatus shown in FIG. 1, the glass weight is controlled with a molten glass support member 3. The specific operation thereof will be explained later.

Below the nozzle 2 is disposed a heat-insulated vessel 5 containing a liquid 4. A molten glass dropped or cut off is cooled with the liquid or formed into a sphere by surface tension and cooled with the liquid, and is received in a glass article receiving container 6 disposed in a lower portion of the heat-insulated vessel 5.

In the present invention, the above liquid 4 refers to a boiling liquid that has a boiling point lower than the glass transition temperature (at which the glass is no longer deformed) or a liquid that is temperature-adjusted to be caused to boil by the amount of heat of the glass. Specifically, when a molten glass or a glass article having a temperature a little lower than the glass transition temperature is put into the liquid, the liquid around the glass is required to be instantly evaporated.

Meanwhile, it is generally considered that when a molten glass drop is put into a liquefied medium having an ultra-low temperature such as liquefied nitrogen, the glass is broken due to a thermal shock. In effect, however, it has been found that good-quality glass articles can be obtained without causing any breakage. The reason therefor is considered to be as follows. The liquid itself has a small heat capacity. When a molten glass is put into the liquid, liquid that comes in contact with the molten glass is instantly boiled by the heat of the molten glass and forms a gas, since the heat of vaporization of the liquid is small. It is considered that a layer of the above gas protects the glass surface. Further, it is also thought that a gas surrounds the glass to decrease the cooling rate of the glass, so that the breakage of the glass caused by a heat shock is prevented.

The above liquid may be water. When a liquid having a large heat of vaporization such as water is used, however, it is advantageous to heat the liquid beforehand so that the medium is easily boiled. The point that should be taken care of when water is used is as follows. The liquid takes the heat of a molten glass, so that liquid around the molten glass can be no longer vaporized, and there can appear a phenomenon in which the molten glass breaks upon a change into a contact between the liquid and the glass. In this case, it is desirable to take the glass article out of the liquid while the liquid in contact with the glass article formed of a molten glass is still boiling. Desirably, the glass article is taken out of the liquid after it is found that the molten glass has a temperature equivalent to, or lower than, a glass transition temperature or lower. When water is used, the above procedures are added, while water has advantages that it is easy to handle and is easily available as compared with an ultra-low temperature liquid such as liquefied nitrogen.

Examples of the above liquid include liquefied helium, liquefied nitrogen, liquefied oxygen, liquefied argon, ethanol, water and mixtures of these. When ethanol or water is used, it is preferred to heat these liquids for use as explained already.

A molten glass dropped or cut is formed (shaped) into a glass element having a weight equivalent to the dropped or cut glass, without being divided to a plurality of parts in the liquid. The above forming (shaping) is made possible since a molten glass is flowed out of the nozzle and controlled to have a predetermined weight. When a molten glass is put into the liquid directly from a crucible, etc., it is not possible to accurately control the weight of the glass device, and further, the molten glass is divided into a plurality of glass parts in the liquid, so that no glass having an intended weight can be obtained.

In the process of receiving a molten glass on a mold and molding the molten glass into a glass element, a number of molds are provided, the molds are consecutively transported into, and out of, a position where molten glass is received, and glass elements made of molten glass are consecutively formed. In contrast, in the above process using the liquid, it is not required to transport the heat-insulated vessel 5 containing the liquid, so that the forming (formation) can be carried out with a very simple apparatus.

<Weight Accuracy of Molten Glass>

The method of controlling a molten glass flowing out of the glass supply unit so that the molten glass has an intended weight, includes a method in which glass flowing out of the glass supply unit is dropped such that the glass forms drops, and the intervals of dropping of the glass are controlled, and a method in which glass flowing out of the glass supply unit shown in FIG. 1 is arranged to continuously flow out, and the glass support member 3 is caused to repeat a cutting operation at constant intervals, thereby to control the weight.

The former method of controlling the intervals of dropping includes a method according to a natural dropping based on a balance between gravity and surface tension in the forward end of the glass supply unit, a method of applying an external force in the dropping direction to control the weight according to a balance between the total of gravity and the external force and the surface tension in the forward end of the glass supply unit, and a method in which the above external force is changed and the weight is controlled on the basis of the timeliness thereof.

The latter method of controlling the weight includes a method of cutting glass continuously flowing out of the glass supply unit with a blade called a shear, and a method in which glass is received on the support member 3 as shown in FIG. 1, to store a glass having a predetermined weight, and then the glass support portion of the support member is rapidly fallen downward to separate the glass. In any method, the accuracy of repetition of a cutting mechanism influences the accuracy of the weight.

It is because the weight can be controlled only when a proper method is employed depending upon the viscosity and weight of the glass that the method of controlling the weight includes several methods as described above. When the weight is controlled on the basis of dropping, no drop having a large mass can be formed due to the relationship of $mg=2\pi r\gamma$ (m: mass of glass gob, g: acceleration of gravity, r: radius of forward end of pipe, γ: surface tension of glass on pipe) which shows a balance between surface tension and gravity. For attaining a larger weight, it is required to cut the glass with a weight control unit, and theoretically, it ought to be possible to obtain a glass gob having an infinite weight by receiving a glass on a support member or a mold. In this case, it may be generally thought that when a large amount of a glass is dropped in the liquid, the glass is broken to pieces. Actually, however, there is a period of time for which the support member keeps the glass on it, and the lower surface is cooled with the support member during the period, so that the lower surface comes to be solidified. For this reason, when the glass retaining its form is put into the liquid, a glass element having an intended weight can be obtained without breaking the glass.

When the intended glass element does not have the form of a sphere but has the form of a lens, or the like, a mold for press-molding is required, and it is required to cool the glass to a transition point temperature before the glass is put into the liquid. In this case, therefore, it is required to add a plurality of molds, a mechanism for transporting them and a pressing mechanism.

The operation of the molten glass support member for controlling the weight of a molten glass will be explained below, while the present invention shall not be limited by the following embodiments.

Figure 2:
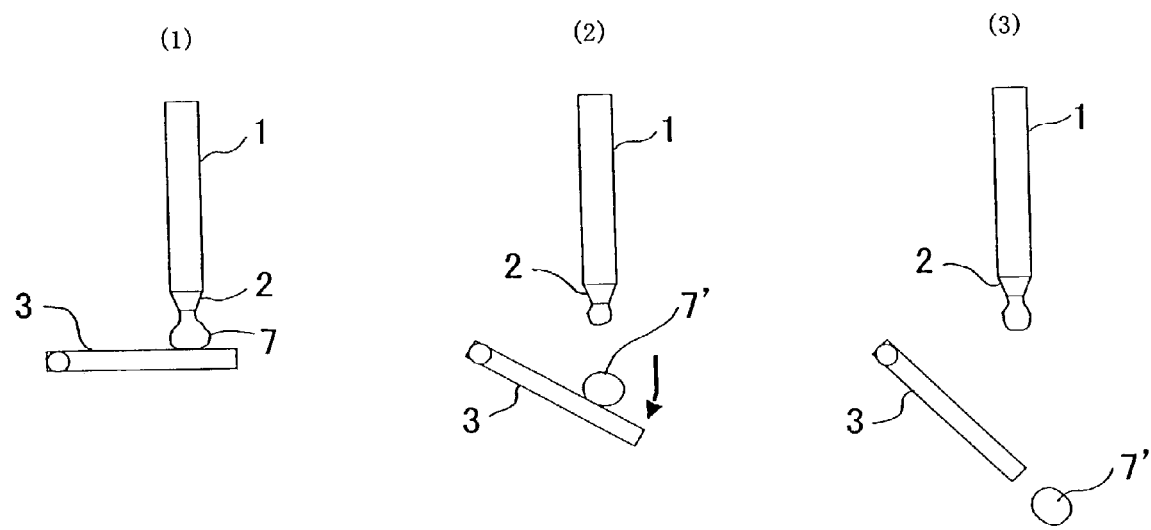
FIGS. 2(1) to 2(3) are schematic drawings of a molten glass support member for explaining one example of the operation for controlling the weight of a molten glass.
Figure 3:
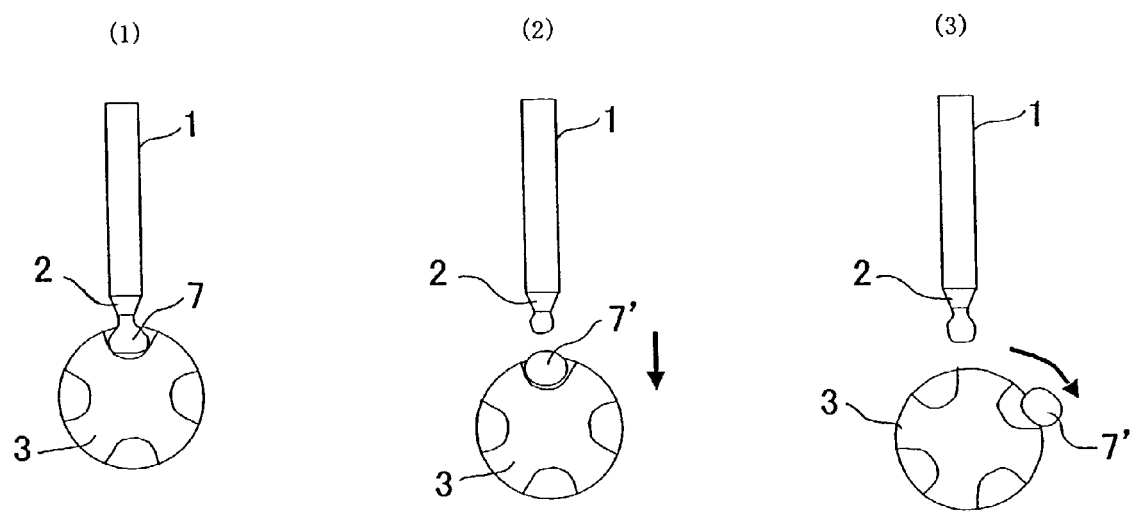
FIGS. 3(1) to 3(3) are schematic drawings of a molten glass support member for explaining another example of the operation for controlling the weight of a molten glass.
Figure 4:
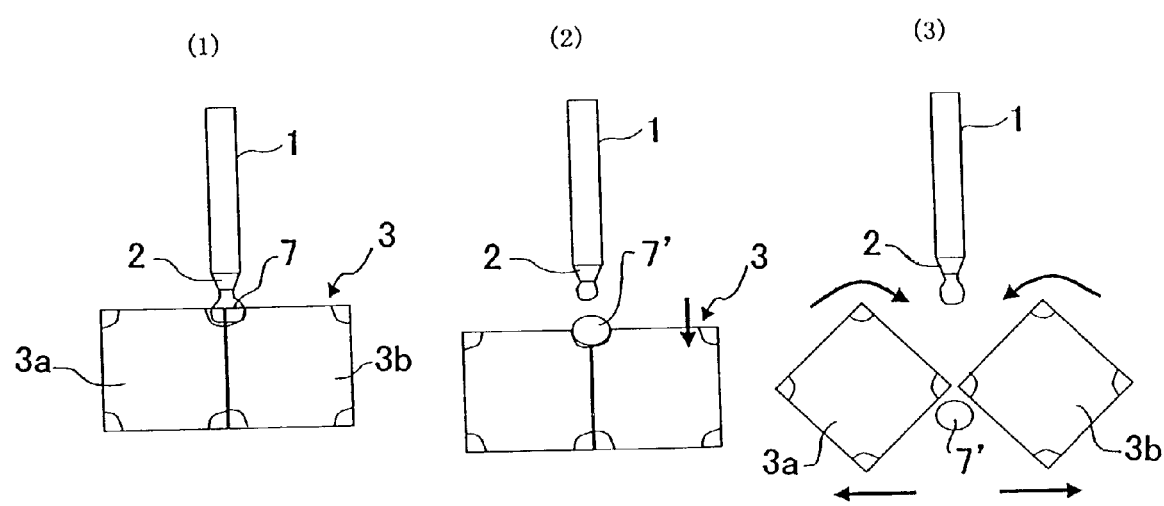
FIGS. 4(1) to 4(3) are schematic drawings of a molten glass support member for explaining still another example of the operation for controlling the weight of a molten glass.

FIGS. 2, 3 and 4 are drawings for explaining embodiments of different operations for controlling the weight of a molten glass in molten glass support members. Each of such support members is incorporated into a weight control unit and operates as follows.

In FIGS. 2(1) to 2(3), the molten glass support member 3 is structured such that it can come into a horizontal state or a titled state at any angle, for example, by means of the expansion and contraction of a cylinder connected to the support member. First, as shown in FIG. 2(1), molten glass 7 flowing out of the nozzle 2 of the glass supply unit 1 is received on a support member 3 that is in a horizontal state. In this case, the molten glass 7 continuously flowing out of the nozzle 2 of the glass supply unit 1 gradually grows. Then, as shown in FIG. 2(2), when the glass has an intended weight, the cylinder (not shown) contracts timely, the support member 3 consequently comes into a tilted state, and a glass gob 7' having a controlled weight is separated from the glass supply unit 1. Further, as shown in FIG. 2(3), the support member 3 is further tilted, whereby the separated glass gob 7' is received in a liquid vessel disposed in a lower position on the basis of gravity. The operations (1) to (3) are repeated, whereby glass gobs are continuously formed.

In FIGS. 3(1) to 3(3), the molten glass support member 3 is structured such that it is rotated and moved downward and upward with a motor and a cylinder which are connected to the support member 3. First, as shown in FIG. 3(1), a spherical hollow portion of a support member 3 receives molten glass 7 flowing out of the nozzle 2 at an angle at which the hollow portion is directly below the glass supply unit 1. Then, as shown in FIG. 3(2), when the glass has an intended weight, a cylinder (not shown) contracts timely, the support member 3 moves vertically downward, and at this moment, a glass gob 7' having a controlled weight is separated from the glass supply unit 1. Further, as shown in FIG. 3(3), the support member 3 is rotated with a motor (not shown), and the glass gob 7' flies out in the rotation direction and is received in a liquid vessel disposed below it. The operations (1) to (3) are repeated, whereby glass gobs are continuously formed.

Further, in FIG. 4, a molten glass support member 3 is rotated, moved upward and downward and moved in a leftward/rightward open/close motion, for example, with a rotation motor, a cylinder and a leftward/rightward open/close motor which are connected to the support member 3. The feature is that the support member 3 is divided into two members, which operate symmetrically, and a portion where two members meet receives a glass. As shown in FIG. 4(1), in a state where the support members 3a and 3b meet, molten glass 7 flowing out of the nozzle 2 of the glass supply unit 1 is received. Then, as shown in FIG. 4(2), when the molten glass has an intended weight, a cylinder (not shown) contracts timely, the support member 3 moves vertically downward, and in this case, a glass gob 7' having a controlled weight is separated from the glass supply unit 1. Further, as shown in FIG. 4(3), in the support member 3, the rotation motor (not shown) and the leftward/rightward open/close motor (not shown) simultaneously operate, and the glass gob 7' is received in the liquid vessel disposed below in the vertical direction. The operations (1) to (3) are repeated, whereby glass gobs are continuously formed.

The material for the support member for use in the above methods is selected, for example, from a refractory metal surface-treated, e.g., by plating, or carbon. The support member is liable to be oxidized since it is repeatedly brought into contact with high-temperature molten glass. When the contact surface to molten glass is oxidized, there may be caused a problem that the releasability between the glass and the support member deteriorates by a phenomenon called baking, or that the surface of a glass gob becomes defective. For overcoming the above problem, it is desirable to cool the support member with water. Further, desirably, the contact surface to the glass is formed of a porous material, a very small amount of a gas is fed, and the glass is received in a state where the glass is semi-floated.

<Putting-Forming>

A molten glass that is put into the liquid as described above still has a viscosity at which the glass is deformable, and the glass is formed into a sphere due to surface tension in the liquid.

A glass gob as a material for precision press-molding is required to have a clean and smooth surface. Further, it is also required to have high internal qualities, to have a form suitable for press-molding, to be free of any portion of breakage such as a cracking and to have a weight accurately in agreement with the weight of an end product. In the process for forming a glass gob by putting a molten glass in the liquid, the weight accuracy is improved by the above dropping or the method of using the above support member, and the molten glass is put into the liquid while the glass has a temperature at which the glass is fully deformable, whereby there can be obtained a glass element that satisfies the above requirements, that is, a glass element that has a clean and smooth surface, high internal qualities and a form suitable for precision press-molding and is free of any portion of breakage such as a cracking. For putting the glass into the liquid while the glass has a temperature at which it is deformable, preferably, the glass still has fluidity immediately before it falls into the liquid.

The state of having fluidity above refers to a state not in which a molten glass gives a form due to a surface tension but in which a molten glass collides with a plate to be deformed when the plate is placed at a level equivalent to the liquid level of the liquid and the molten glass is dropped under the same condition.

When the glass element as an end product is to have the form of not a sphere but a lens or the like, it is required to mold the glass with a press mold, cool the glass and lower the temperature of the glass to a transition point temperature before it is put into the liquid. Further, when a molten glass is dropped into the liquid directly from the nozzle and when an ultra-low temperature liquefied medium such as liquefied nitrogen is used as the above liquid, preferably, the glass is dropped into the liquid while the glass has a temperature at which the glass is fully deformable, and the outlet port of the flow nozzle is disposed at least 100 mm above the surface of the liquid for preventing the liquid from decreasing the nozzle temperature. Further, even when the medium that has boiled and vaporized restores a gaseous phase, it is still in a low-temperature state. When coming in contact with the nozzle, therefore, the vaporized medium decrease the nozzle temperature and constitutes a disturbance factor against the dropping condition. Therefore, preferably, on the basis of the advantage that the vaporized medium has a low temperature and has a larger specific gravity than atmosphere, at least part of the upper end or the entire upper end of sidewall of the vessel containing the above liquid is positioned at a level lower than the level of the port of the nozzle for dropping a molten glass, so that the vaporized medium flows out of the vessel without coming in contact with the nozzle.

When a low-temperature liquefied medium such as liquefied nitrogen or the like is used as a liquid, preferably, the vessel containing the liquid has a heat-insulation structure so that the liquefied medium is maintained at a low temperature. Since the liquefied medium is constantly boiling and evaporating, the vessel is supplied with new liquid as required, so that the vessel constantly contains the liquid in an amount sufficient for the molding. Further, when the liquid boils to form vapor like water and moves upward, preferably, gas is allowed to flow only in the vicinity of the liquid level so that the vapor does not come in contact with the nozzle.

Desirably, the distance from the liquid level (surface) to the bottom of the vessel is determined such that a glass that has been put comes to have a glass transition temperature or lower upon arrival at the bottom of the vessel. When the distance from the liquid level to the bottom of the vessel is small, the molten glass may collide with the bottom of the container to be deformed while the glass is in a still deformable state. When the above distance is large, there is required a vertically very large apparatus including units for melting, flowing and dropping glass, and it is difficult to replace a conventional apparatus having a conventional mold. Further, when the vessel is deep, not only a large amount of the liquid is required, but also it is troublesome to recover glass elements, which may cause a hindrance on an improvement in productivity. From the above viewpoint, desirably, the depth of the liquid in a position where a molten glass is dropped is 60 to 120 cm.

As a method in which no deep vessel is substantially required and a glass does not collide with the bottom of the vessel so that the glass is not deformed, there may be employed a method in which a guide for guiding a glass that is poured into the liquid is provided, the glass is guided with the guide while the glass is moved downward, to cool and form the glass. In one embodiment, a gutter-like guide is disposed in the liquid, and a glass that is put into the liquid and slowed down is received on the upper portion of the gutter-like guide and rolled down in the guide to mold the glass into a spherical glass element. Further, an upward flow of the liquid may be formed in a position where the glass is dropped, to prevent a collision between the glass and the bottom of the vessel.

When a molten glass is put into the liquid while the glass has a transition point temperature or higher, the glass is cooled in a state where it is surrounded by a vaporized medium as described above with or without the above guide, so that a glass element having the form of a sphere close to a true sphere can be easily formed. A spherical glass element is highly valuable in use for producing a glass article having high revolution symmetricalness such as a lens. When the sphericity of a glass element is expressed by [(major diameter−minor diameter)/(arithmetical mean of major diameter and minor diameter)]×100, there can be easily produced a glass element having a sphericity in the range of from 0.1 to 5% (which means that the form is closer to a true sphere with a decrease in the value).

For forming a glass element having a form different from a sphere for precision press-molding, there may be employed a method in which a molten glass drop is received on a support member to flatten the lower surface of the drop, and the drop is again molded in the liquid to obtain a glass element having the form of a marble, or the like. Further, there may be employed a method in which the glass is supported in the liquid in a state where the glass is deformable, to flatten the bottom surface. In this case, it is required to take measures to avoid the collision of molten glass drops that are put into the liquid one after another. For forming a glass element having a bottom-flat form such as a marble form, advantageously, the molten glass drop has a relatively large weight, and it is desirable to use molten glass drops having the weight of at least 50 mg each as a standard.

According to the above method, fine convexoconcave shapes called orange peel do not occur in the surface, and there can be produced a glass element having a smooth surface free of a cracking and having high internal qualities. The glass is put in the liquid in a state where it is in a molten glass state, and even in such a case, a glass element can be molded without any problem of a sink mark or breakage. When a large distance can be provided between the flow nozzle and the liquid level, the glass can be put into the liquid in a state where it is in a hardened state. In the above manner, the glass can be uniformly and slowly cooled without damaging the glass surface.

<Taking Out of Glass Article>

As one example of a method of taking out glass elements from the liquid, there may be employed a method in which a net-like receiver such as a metal net is placed in the vessel containing the liquid so that glass elements are received in the receiver, and the receiver with the glass elements in it is taken out of the liquid after a certain amount of the glass elements have gathered. There may be also employed a method in which one end of a mesh belt is placed on the bottom of the vessel and the mesh belt is rotated at a constant rate to continuously take out glass elements one after another. In one example of the method of taking a glass element out of the liquid while liquid in contact with the glass element is boiling, a conveyor for transporting glass elements out of the liquid is provided, and the speed of the conveyor is set at a such a rate that the glass element is cooled to a glass transition temperature or lower and that the glass element is transported out of the liquid while the above boiling is observed.

Liquefied helium, liquefied nitrogen, liquefied oxygen, liquefied argon, fluoroether, ethanol and water for use as a liquid in the present invention have the following boiling points under atmospheric pressure, and it is therefore considered that recovered glass elements are cooled to a temperature close to the boiling points of such media.

| | |
|---|---|
| Boiling point of liquefied helium | −267° C. |
| Boiling point of liquefied nitrogen | −196° C. |
| Boiling point of liquefied oxygen | −183° C. |
| Boiling point of liquefied argon | −186° C. |
| Boiling point of hydrofluoroether (trade name "Nobek HFE7200", supplied by 3M Co., Ltd.) coming under fluoroether | 76° C. |
| Boiling point of ethanol | 76° C. |
| Water | 100° C. |

When the above liquefied helium, liquefied nitrogen, liquefied oxygen, liquefied argon or the like is used for forming, and when a glass element having a very low temperature is exposed in atmosphere, moisture condensation occurs on the surface of the glass element. When such a glass element is left in atmosphere as it is, a deteriorated layer called burned layer is formed on the surface. Since a glass element having a burned layer is not usable for precision press molding, it is desirable to take measures against moisture condensation that causes the burned layer.

As measures to take, there is employed a method in which a glass element recovered from the liquid is immersed in a volatile liquid and then dried. The time period for the immersion can be determined to be a period of time that is so sufficient that the temperature of a glass element increases up to a temperature at which no moisture condensation takes place. Preferably, the temperature of the above volatile liquid is higher than the dew point of a molding atmosphere and lower than the volatilization temperature of the volatile liquid. When the volatile liquid has room temperature, it is advantageous for handling. The volatile liquid includes, for example, methanol, ethanol, isopropyl alcohol, acetone and hydrofluorocarbon. Then, a glass element taken out of the volatile liquid is dried, to remove volatile liquid on its surface. In the above manner, glass elements can be mass-produced even by molding in atmosphere without causing any burned layer on the surface.

The process for the production of a glass article, provided by the present invention, is suitably used particularly for producing a preform for press-molding. In the present invention, as a process for the production of the above preform for press-molding, there can be employed a process comprising dropping a molten glass having a predetermined weight from a nozzle, receiving said dropped glass with a liquefied medium obtained by cooling and liquefying a substance that exhibits a gaseous phase in room temperature under atmospheric pressure, to form a preform having a weight equivalent to said weight, and taking out the preform.

The above process for the production of a preform will be explained with reference to attached drawings hereinafter.

Figure 5:
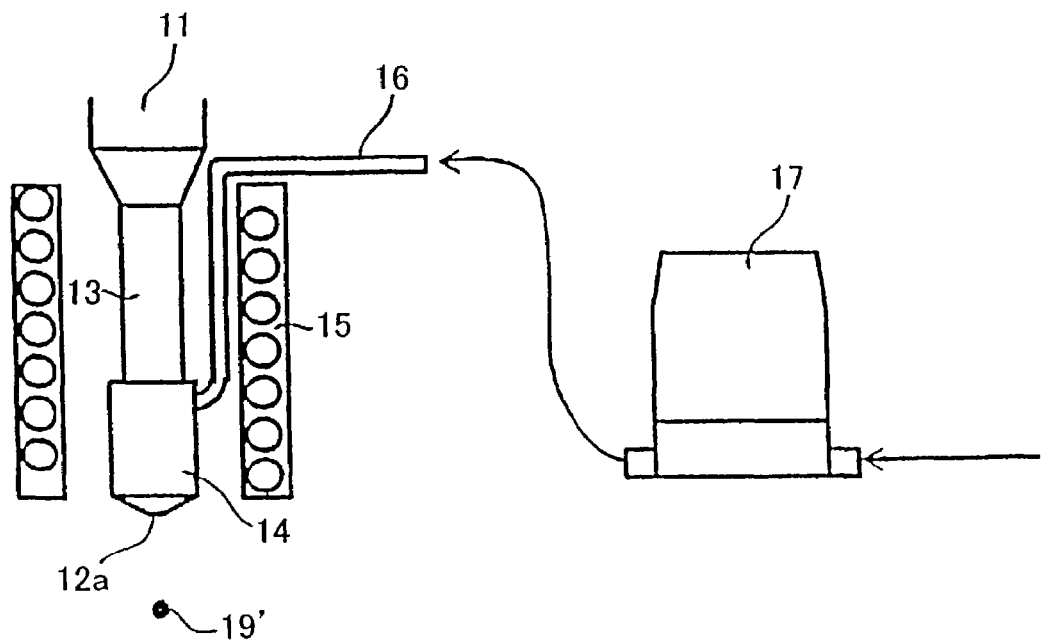
FIG. 5 is a schematic drawing of one example of a preform forming apparatus for use in the process of the present invention.
Figure 5:
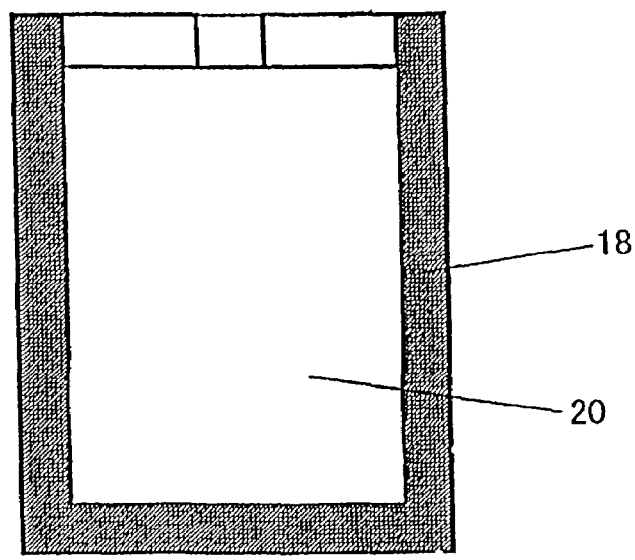
Figure 6:
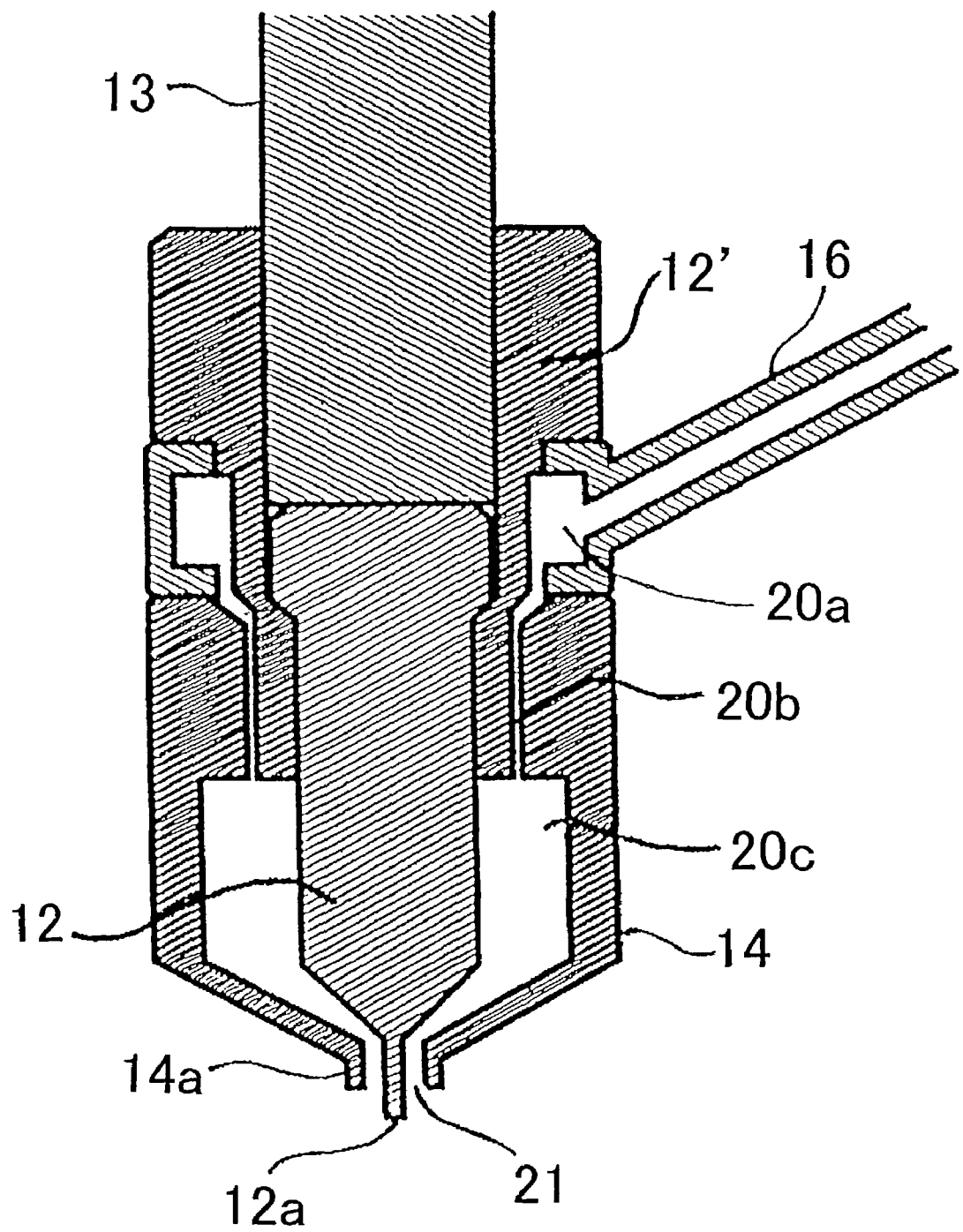
FIG. 6 is an enlarged partial cross-sectional view of one example of nozzle and nozzle cover area of the preform forming apparatus shown in FIG. 5.
Figure 7:
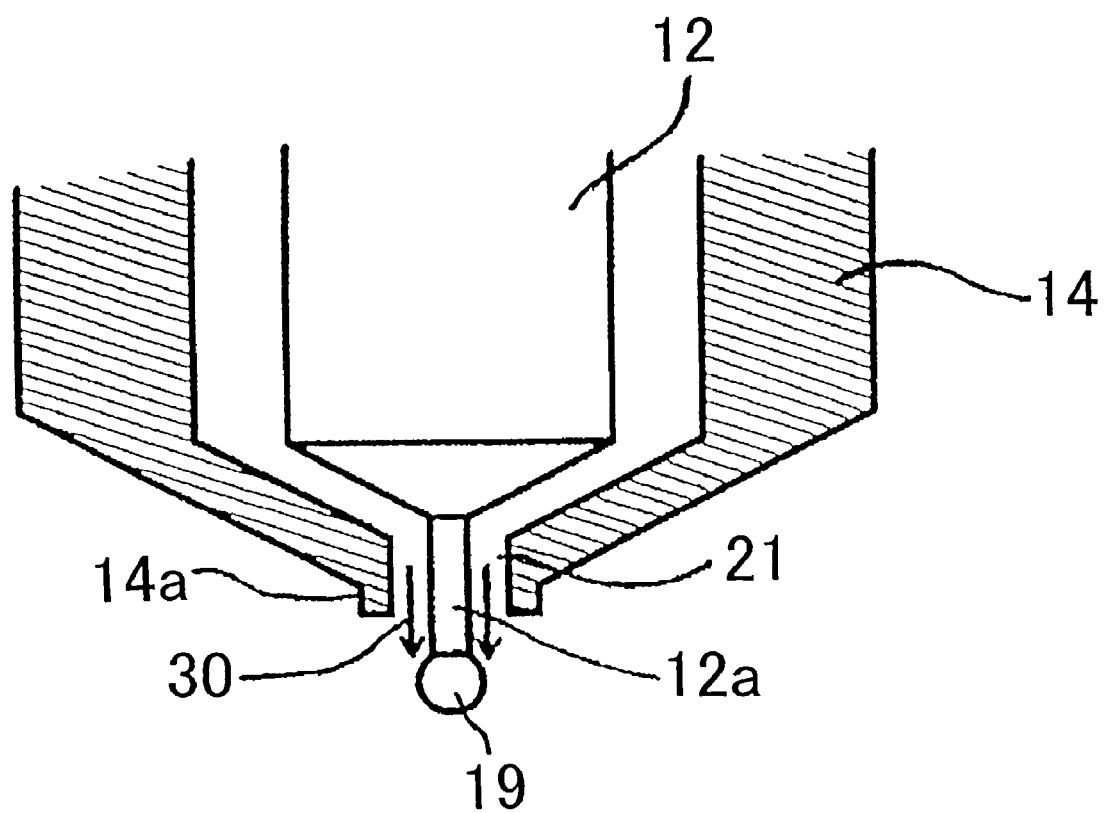
FIG. 7 is an enlarged partial cross-sectional view of one example of a nozzle forward end portion of the preform forming apparatus shown in FIG. 5.

FIG. 5 is a schematic drawing of one example of a preform molding apparatus, FIG. 6 is an enlarged partial cross-sectional view of one example of a nozzle, a nozzle cover and their vicinities of the above apparatus, and FIG. 7 is an enlarged partial cross-sectional view of one example of a nozzle forward end portion of the above apparatus.

In the apparatus shown in FIG. 5, above a molten glass supply unit 11 is disposed a glass melting furnace (not shown) containing a melting glass that is a material for preforms. Molten glass is continuously supplied to the molten glass supply unit 11 from the above furnace and dropped from a flow outlet port provided in a forward end 12a of a nozzle 12 positioned below the glass supply unit 11. When a preform is formed, a constant amount of molten glass is formed. For this purpose, the flow speed of molten glass from the nozzle 12 and the intervals of dropping the molten glass are maintained at constant rates, so that the weight of a molten glass drop 19' is constantly maintained at a constant level.

Right below the nozzle 12 is disposed a heat-insulated vessel 18 containing a liquefied medium 20, and a dropped molten glass is received in the liquefied medium to be molded into a preform. In this case, a medium prepared by cooling and liquefying a substance that exhibits a gaseous phase at room temperature under atmospheric pressure is used as the above liquefied medium 20. The above liquefied medium can be selected from liquefied nitrogen, liquefied oxygen, liquefied argon, liquefied helium, liquefied air or mixtures of these. Of these, liquefied nitrogen is preferred in view of easiness in handling and a price.

First, the molten glass dropping method will be explained. In this method, molten glass is continuously dropped from the nozzle, a gas flow flowing at a constant rate is caused to occur along the surface of an outer circumference of the above nozzle, a gas pressure is applied to a molten glass that appears from the forward end of the above nozzle with the above gas flow, and the above molten glass is dropped into the liquefied medium.

The apparatuses shown in FIGS. 5 and 6 have a nozzle 12 that flows out and drops a molten glass and has an axis maintained in the vertical direction (the direction of gravity), a molten glass conduit 13 for guiding molten glass supplied from the molten glass supply unit 11 to the nozzle 12, a nozzle cover 14 covering a side surface of the nozzle 12 but not covering the nozzle forward end portion 12a, and a high-frequency induction heating unit 15 disposed so as to cover the side surface of the molten glass conduit 13 and the side surface of the nozzle cover 14. That internal wall of the molten glass conduit 13 which comes in contact with molten glass is generally made of platinum or a platinum alloy. A nozzle cover opening portion 21 is formed between a forward end portion 14a of the nozzle cover 14 and the nozzle forward end portion 12a, and the nozzle forward end portion 12a is projected with respect to the forward end portion 14a of the nozzle cover 14.

One end of a gas supply conduit 16 for supplying gas ejected through the nozzle cover opening portion 21 is attached to the nozzle cover 14. The other end of the gas supply conduit 16 is connected to a gas cylinder (not shown) through a mass flow controller 17. Gas introduced through a space between the nozzle and the nozzle cover comes in contact with molten glass that appears on the flow outlet port of the nozzle forward end portion 14a, and a gas pressure in the vertically downward direction is applied to the molten glass. The molten glass having a predetermined weight is dropped from the flow outlet port in a state where the gas pressure is applied thereto, and the molten glass drop is received in the liquefied medium contained in the vessel to be formed into a spherical preform.

In FIG. 6, the gas supply conduit 16 is for supplying gas to a flow passage 20a provided around the entire circumference of a nozzle support portion 12'. Gas passes through a slit 20b, which is connected to the flow passage 20a, provided between the outer circumference surface of the nozzle support portion 12' and the nozzle cover 14 and existing around the entire circumference of the nozzle support portion 12'. The gas is introduced into a flow passage 20c formed between the outer circumference surface of the nozzle 12 and the nozzle cover 14, and is ejected out of the opening portion 21 of the nozzle cover 14. The slit 20b extends along the axial direction of the nozzle 12, and the gas is rectified by passing through the slit 20b, so that a gas stream caused by the flowing of the gas moves vertically downward along the outer circumference surface of the nozzle 12. The slit 20b is formed of rectification plates (not shown), and the rectification plates are similar to rectification plates in FIG. 8 to be discussed later.

FIG. 7 is an enlarged view of vicinities of the nozzle forward end portion 12a and the nozzle cover opening portion 21. The outer diameter of the nozzle 12 and the inner diameter of the nozzle cover 14 are decreased in their forward end portions to form the nozzle forward end portion 12a and the nozzle cover forward end portion 14a. The nozzle cover opening portion 21 is formed between the nozzle forward end portion 12a and the nozzle cover forward end portion 14a. In the nozzle cover opening portion 21, the flow passage cross-sectional area of the gas stream is decreased to increase the flow speed. The direction of a gas stream 30 faces vertically downward in the nozzle forward end portion 12a. In the nozzle forward end portion 12a, a molten glass 19 flowing down the nozzle 12 grows in the form of a liquid drop, and the molten glass surface receives a gas pressure of the gas stream 30 in the vertically downward direction. In a natural dropping method using no gas stream, when the gravity working on a molten glass that appears from the nozzle forward end portion 12a is greater than a force that keeps the molten glass on the nozzle forward end portion 12 with surface tension, etc., the dropping takes place. When a gas pressure is applied to the molten glass 19 in the vertically downward direction with the gas stream 30 constantly flowing at a constant rate like the present invention, the molten glass can be dropped when it has a smaller weight than that in the natural dropping method. Since the flow rate of the gas supplied is maintained at a constant level with the mass flow controller 17, the flow rate of the gas stream flowing vertically downward through the nozzle cover opening portion 21 is also maintained at a constant level. And, the gas stream 30 around the entire outer circumference of the nozzle forward end portion 12a is also kept in the vertically downward direction in which the molten glass 19 drops, so that a stable gas pressure is applied to the molten glass 19 that has appeared from the nozzle forward end portion 12a. For improving the weight accuracy of the preform, preferably, the above gas stream is caused to flow along the entire outer circumference of the above nozzle as described above. As described above, the gas pressure can be applied to the molten glass with the gas stream that can be taken as a laminar flow, so that the weight of each molten glass drop comes to be constant, and that preforms having high weight accuracy can be obtained. When the direction of the gas stream in the nozzle forward end portion 12 is not kept in one direction, stream components collide with one another to form a turbulent flow, and the size and direction of the gas pressure to be applied to the molten glass come to be unstable. When the size and direction of the gas pressure are destabilized, the intervals of dropping vary, which causes the weights of preforms to vary.

For decreasing the variability of the preform weight, preferably, there is employed a method in which the outer circumference surface of the above nozzle is covered with a nozzle cover to form a flow passage of the above gas stream between the above nozzle and the above nozzle cover, a nozzle cover opening portion is formed between the forward end portion of the above nozzle cover and the nozzle forward end portion and the above gas stream is caused to occur in a state where the above nozzle forward end portion is projected with respect to the above nozzle cover forward end portion; a method in which the distance between the above nozzle and the above nozzle cover at least in the vicinity of the above nozzle cover opening portion is made uniform around the entire circumference, or a combination of these methods.

Figure 8:
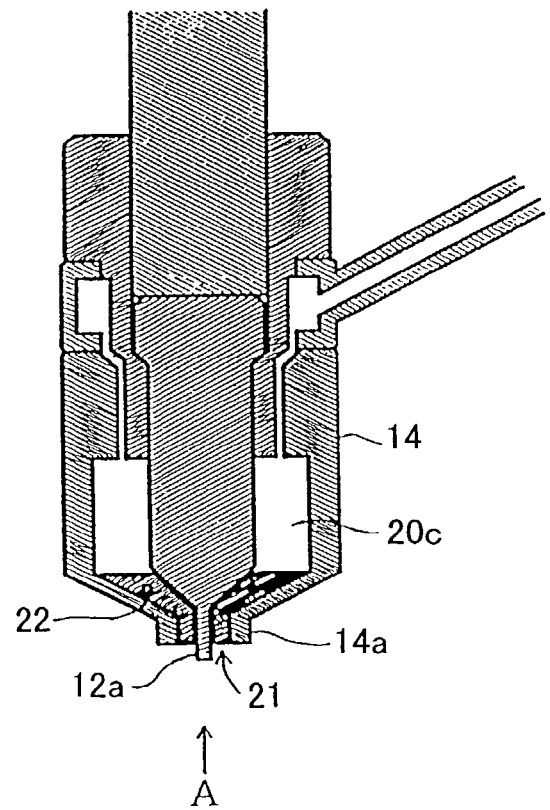
FIG. 8 is a schematic drawing of another embodiment of the nozzle and nozzle cover area of the preform forming apparatus shown in FIG. 5.
Figure 8:
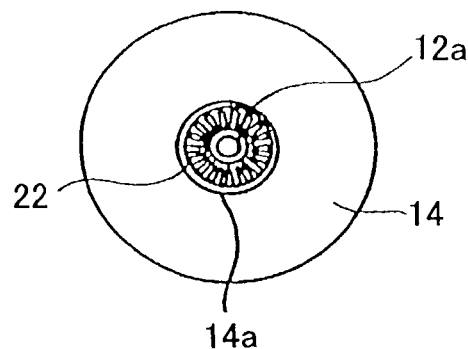
Figure 8:
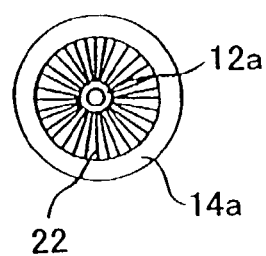

FIGS. 8(1) to 8(3) are schematic drawings of other embodiment of the vicinity of the nozzle and the nozzle cover. FIG. 8(1) is an enlarged partial cross-sectional view, FIG. 8(2) is a plan view obtained by viewing the embodiment in the direction A shown in FIG. 8(1), and FIG. 8(3) is a partially enlarged view of FIG. 8(2).

As shown in FIGS. 8(1) to 8(3), rectification plates 22 are provided in the nozzle cover opening portion 21 formed between the nozzle forward end portion 12a and the nozzle cover forward end portion 14a and part of the flow passage 20c, whereby the gas stream can be kept in parallel, and the gas stream can be kept in a laminar flow state.

The distance from one rectification plate 22 to another adjacent rectification plate 22 is preferably approximately 0.1 to 0.5 mm. The rectification plates 22 preferably have a small thickness for avoiding the turbulence of the gas stream. The number and positions of the rectification plates 22 shall not be limited to the embodiment shown in FIGS. 8(1) and 8(2). For example, the rectification plates 22 may be formed only between the nozzle forward end portion 12a and the nozzle cover forward end portion 14a, or the rectification plates 22 may be formed so as to reach a position somewhere between the beginning and the end of the flow passage 20c in FIG. 8(1).

When the molten glass is dropped, preferably, the flow rate of the gas stream is set such that the weight accuracy to be described later in the intended weight of the preform can be obtained since a very small change in the flow rate of the gas stream causes the molten glass drop to change in weight. The temperature of the above gas stream is preferably in the range within 50° C. higher and lower than a temperature of the above nozzle forward end portion.

The above dropping method (called "laminar flow molding") is suitable as a dropping method particularly for molding a very small preform. As other dropping method, there may be employed a method in which gas is intermittently blown to molten glass that appears on the nozzle forward end so as to apply gas pressure timely for dropping the molten glass, or a method in which a constant downward gas pressure is continuously applied and further a gas pressure is intermittently applied in the downward direction timely for dropping. However, the laminar flow molding is preferred in view of an improvement in the weight accuracy of preforms. The weight accuracy of preforms obtained by the laminar flow molding is within ±3%, preferably within ±1%, more preferably within ±0.1%. As a method preferred in view of an improvement in the weight accuracy of preforms, there may be employed a natural dropping method without the application of a gas pressure. This method is preferred for obtaining preforms having a larger weight than that in the above-described method, and the weight of preforms is controlled on the basis of the outer diameter of the nozzle from which molten glass is flowed out. The weight accuracy of preforms obtained by the natural dropping method is generally within ±4%, preferably within ±0.5%.

When preforms having a further larger size are produced, there may be employed a method in which the forward end portion of flow of a molten glass flowing out of a flow pipe is received on a support mechanism, the support for the forward end of the molten glass flow is removed timely as predetermined, to separate the forward end portion from the molten glass flow, and the molten glass gob is poured into the liquefied medium. The above support can be removed timely such that a molten glass gob having an intended weight is obtained. For this purpose, preferably, this method also employs a constant flow speed of the molten glass. The weight accuracy of the thus-obtained preforms is generally within ±5%, preferably within ±1%.

In the laminar flow molding, the intervals of dropping molten glass into the liquefied medium are set and maintained by controlling the flow rate of the gas stream, the nozzle temperature and the speed of the molten glass that is flowing out. In the method of intermittently apply a gas pressure to the molten glass that appears on the nozzle forward end portion, the above intervals are set and maintained by controlling the timing of applying the gas pressure and the speed of the molten glass that is flowing out in addition to the controlling of the nozzle temperature. In the natural dropping method, the above intervals are set and maintained by controlling the nozzle temperature and the speed of the molten glass that is flowing out. In the method using the support member, the above intervals are set and maintained by controlling the timing of removing the support, the nozzle temperature and the speed of the molten glass that is flowing out. It is required to adjust the nozzle temperature depending upon glass to be molded, while the nozzle temperature can be generally in the range of from 800 to 1,100° C.

The temperature and viscosity of the glass as indices will be generally discussed below. When the glass is dropped, the temperature of the glass is 800 to 1,100° C., and the viscosity thereof is 0.1 to $10^2$ Pa·s. When the support member is used, for example, the temperature of the support member is in the range of from 100 to 500° C., the temperature of the glass when it is poured into the liquefied medium is 600 to 1,000° C., and the viscosity thereof is 1 to $10^4$ Pa·s.

According to the present invention, there is also provided a process for the production of a glass article by forming a glass in a softened state, which comprises cooling said glass article in a boiling liquid or a liquid that is caused to boil by the amount of heat of the glass. The above liquid can be used for cooling a glass element obtained by forming a glass in a softened state and decreasing the temperature of the glass article to a glass transition temperature or lower.

<Glass for Glass Article>

The press-molding preform formed by forming according to the above process of the present invention is suitable for precision press-molding optical devices including an aspherical lens and a microlens, and the process of the present invention can be therefore naturally applied to the production of press-molded articles that do require no severe surface standard since the post step of polishing is carried out therefor. Further, the above liquid can be used for cooling a glass element obtained by press-molding a glass in a softened state and decreasing its temperature to a transition temperature or lower. In this case, the above glass element is used for an optical device, so that a glass that has been molded in the form of a lens, a prism, or the like is poured into the liquid.

Therefore, the glass for use in the present invention can be any molten glass or a glass in a softened state so long as it gives an optical glass, and it is not specially limited in kind.

However, in the process for the production of a press-molding preform, in which a liquefied medium obtained by cooling and liquefying a substance that exhibits a gaseous state at room temperature under atmospheric pressure is used as a liquid and a molten glass having a predetermined weight is dropped from the nozzle into the above liquefied medium, it is preferred to use the following glass.

The glass to which the above process is applied can be any glass so long as the temperature at which it comes to have a viscosity sufficient for its flowing out of a nozzle is higher than the liquidus temperature thereof, and the glass is not specially limited. However, a glass having a liquidus temperature of 1000° C. or lower is preferred. For using a glass gob as a preform for precision press-molding, a glass having a sag temperature of 640° C. or lower is preferred. Examples of the above glass preferably include a borosilicate glass containing an alkali metal oxide, a borosilicate glass that is the above borosilicate glass and whose alkali metal oxide is lithium oxide, a phosphate glass containing an alkali metal oxide, and a phosphate glass that is the above phosphate glass and further contains at least one metal oxide selected from zinc oxide or alkaline earth metal oxides. More specific examples of the above glass include an aluminoborosilicate glass containing $Li_2O$, $CaO$, $BaO$ and $La_2O_3$, and a borosilicate glass containing $Li_2O$, $CaO$, $ZrO_2$, $TiO_2$ and $Nb_2O_5$.

The above process is suitably applied to an optical glass containing $P_2O_5$ (particularly, an optical glass having a $P_2O_5$ content of at least 20 mol %) that is easily fused to a mold in preform-molding with a conventional mold. $P_2O_5$ is a component that works as an important component in a glass for precision press-molding.

Further, the above process is also suitable for producing a preform formed of an optical glass containing a transition metal element and/or Ti. The transition metal element and Ti are sometimes particularly essential components of an optical glass as a component for adjusting a refractive index. An optical glass containing such a component is easily colored, and when it is dropped in an liquid other than the liquefied medium, such as an organic solvent, the glass having a high temperature and the solvent react to reduce metal ion in the glass. As a result, a preform to be molded into an optical device is colored in some cases. When the liquefied medium is used, the coloring caused by the above reduction reaction does not take place, so that the above process is suitable for molding the above optical glass. Examples of the transition metal element that is easily colored include Nb and W, and Ti is also easily colorable.

Further, the above process is also suitable for producing a preform formed of an optical glass substantially containing no lead. When a molten glass containing lead is dropped from a nozzle, the outer circumference surface of forward end of the nozzle comes to be wet backwardly, which causes a preform to have striae and devitrification. Further, lead is a substance whose use should be suppressed due to its environmentally polluting effect, so that it is preferred to apply the above process to a glass containing no lead.

Further, the above process is suitable for producing a preform formed of an optical glass substantially containing no fluorine. A glass containing fluorine has a high liquidus temperature, and for preventing the devitrification of the glass, a high temperature is required for causing a molten glass to flow out of the nozzle. As a result, the viscosity of the glass when it flows out decreases to a great extent, and it is very difficult to produce a drop from the nozzle and the glass forms a molten glass flow and flows into the liquefied medium. In such a state, it is difficult to control the preform weight. It is therefore desirable to apply the above process to a glass substantially containing no fluorine.

In the process for the production of an optical element, provided by the present invention, the above-obtained preform is heated, softened and precision-press-molded, to produce an optical device. The precision press-molding of the preform will be explained below.

<Precision Press-Molding of Preform>

Precision press-molding is a method in which a preform in a heated and softened state is press-molded with a mold to directly produce a press-molded article having very high accuracy, such as optical devices including an aspherical lens, a microlens and the like. The above method is generally called mold optics molding. The molding surface of the mold to be used for the precision press molding is a surface that is remarkably highly accurately processed such that the form of a final product such as an optical element is accurately transferred to a glass. The material forming the mold is made of a material such as silicon carbide or an ultra-hard alloy, and in some cases, a release film such as a carbon film or a platinum alloy film is formed on the molding surface.

In the precision press-molding, a preform is heated, and when the preform comes to have a viscosity in the range of from $10^6$ to $10^8$ Pa·s, it is press-molded with the above mold in a non-oxidizing atmosphere such as a nitrogen atmosphere. The optical function surface of an aspherical lens is accurately transferred to a glass by the above press-molding, to produce an optical device.

When the process of starting with a molten glass to arrive at an optical device is viewed as a series of steps, if quality preforms can be mass-produced with high productivity, it means that quality optical devices can be produced with high productivity.

While the above press-molding method is applied to precision press-molding, it can be applied to molding a preform according to a press-molding other than the precision press-molding method. In such a case, preforms are not required to have such high weight accuracy. In the above method, a preform is softened under heat and press-molded with a mold having an upper mold member and a lower mold member in atmosphere. When an optical device such as a lens is produced, an intermediate product called an optical device blank having a form close to the form of an optical device as a final product is prepared by the above press-molding, and the blank is lapped and polished to complete it into an optical device as a final product. Since lapping and polishing are carried out at a last stage as described above, the molding accuracy in the press-molding can be a little low as compared with the accuracy in the precision press-molding.

An optical thin film such as an anti-reflection film may be formed on the thus-produced optical device regardless of which molding method is used for production, a precision press-molding method or other press-molding method. In the above manner, lenses such as an aspherical lens and a microlens, various optical devices including a filter and a prism and optical parts for use in the field of optocommunication can be produced.

EXAMPLES

The present invention will be explained further in detail with reference to Examples hereinafter, while the present invention shall not by limited by these Examples.

Examples 1-5

With an apparatus shown in FIG. 5, molten glass was dropped in atmosphere and the drops were received in liquefied nitrogen to mold spherical preforms. The molten glass was a dense flint glass that was fully clarified and homogenized and which contained niobium and substantially contained neither lead nor fluorine.

Three apparatuses were used for forming the preforms. The three apparatuses had nozzle portions for flowing out the molten glass, and the nozzle portions had different sizes. The nozzle portions of the apparatuses were made of a platinum alloy. One nozzle portion had an outer diameter of 1.1 mm and an inner diameter of 0.4 mm, the second one had an outer diameter of 3.7 mm and an inner diameter of 1.0 mm, and the third one had an outer diameter of 6.0 mm and an inner diameter of 3.0 mm. While the molten glass was flowed out, the nozzle temperature was maintained at 940° C. In Examples 1 to 4, while the flow rate of dry nitrogen gas flowing vertically downward along the entire outer circumference of each nozzle was accurately adjusted with a mass flow controller, the dropping was continuously carried out. In Example 5, a support member heated at 300° C. was used to prepare molten glass gobs, and the gobs were continuously put into liquefied nitrogen. Preforms formed in the liquefied nitrogen and accumulated in the vessel were taken up with a net that had been set in the vessel beforehand, and the preforms were immersed in ethanol as a volatile liquid for 2 minutes. Then, the volatile liquid was removed by filtration, and the preforms were dried with a dryer. The preforms were readily dried, and no moisture condensation took place on preform surfaces. The volatile liquid had a room temperature.

Table 1 shows a height of each nozzle measured from the liquid level of the liquefied nitrogen, a depth of the liquefied nitrogen in a position where the molten glass drops were dropped, dropping intervals, weights of the preforms, the sphericity of the preforms and surface states of the preforms.

TABLE 1

|  | Ex. 1 | Ex. 2 | Ex. 3 | Ex. 4 | Ex. 5 |
| --- | --- | --- | --- | --- | --- |
| Dropping intervals (msecond) | 200 | 300 | 500 | 1000 | 2000 |
| Nozzle height (mm) | 30 | 300 | 400 | 700 | 1000 |
| Depth of liquefied nitrogen (mm) | 350 | 750 | 750 | 1000 | 1200 |
| Weight of preform (mg) | 2 | 10 | 30 | 250 | 1000 |
| Sphericity (%)* | 0.2 | 2 | 3 | 4 | 5 |
| Surface state of preform | ND** | ND** | ND** | ND** | ND** |

Ex. = Example, *[(major diameter − minor diameter)/(arithmetic mean of major diameter and minor diameter)] × 100, **Not defective Under the above molding conditions, excellent spherical preforms were produced. When a gutter-like guide that has been explained already was used, excellent results were also obtained. While the above Examples used liquefied nitrogen as a liquefied medium, the use of any medium of liquefied oxygen, liquefied argon, liquefied helium and liquefied air also gave excellent results. When liquefied oxygen is used, it is required to readily dilute evaporated oxygen gas having a high concentration with air or nitrogen, to provide an exhaust gas path or take other means, for avoiding fire, and the like. Further, when preforms were molded from a glass containing Ti, W and the like, no coloring of the glass was found.

Referential Example

Then, preforms were formed while the depth of the liquid nitrogen from the liquid level was brought into a range outside the already described preferred range. Specifically, forming by dropping was carried out in the same manner as in Example 3 except that the height of the nozzle forward end from the liquid level was changed to 100 mm and that the depth of the liquefied nitrogen where the molten glass was dropped was changed to 100 mm. There were obtained preforms which were free of surface defects such as orange peel but had a distorted form and a mark formed by a contact to the bottom of the vessel.

Examples 6-10

Examples 6 to 10 used boiling water under heat as a liquid and used the same apparatuses as those used in Example 1 to 5. The nozzles used in Examples 6 to 9 corresponded to the nozzles used in Examples 1 to 4, respectively. In Example 10, molten glass gobs were prepared with a support member heated at 300° C. in the same manner as in Example 5 and continuously poured into the above boiling water. Further, air was flowed in the vicinity of the water surface level so that water vapor generated from the boiling water did not come in contact with the nozzles. In the same manner as in Example 5, molded preforms were taken out of the vessel, immersed in ethanol as a volatile liquid, and dried with a dryer. The preforms may be dried with a dryer without immersing them in ethanol.

Table 2 shows forming conditions and forming results similarly to Table 1. In Examples 6 to 10, further, a gutter-like guide may be used in the same manner as in Examples 1 to 5.

While Examples 6 to 10 used boiling water as a liquid, water under heat at less than 100° C. may be used so that water around the dropped or put glass was caused to boil by the amount of heat of the glass. The temperature of the water can be adjusted as required depending upon the amount of heat of the glass to be dropped or put, the intervals of dropping (putting) and the amount of the water. It can be found on the basis of the appearance of boiling water around the dropped or put glass whether or not the temperature of the water is proper.

Instead of the recovery of preforms from the liquid by taking up them with a net, there may be employed a method in which a belt conveyer is placed in the liquid vessel and the dropped or put glass is dropped in the liquid or rolled down the gutter-like guide to lie on the belt conveyer. The time period (corresponding to the transport speed of the belt conveyer) required to transport a preform out of the liquid with the belt conveyer is set such that boiling of the liquid is found until the preform is transported out of the liquid. Further, it is also set to be time period sufficient for cooling the preform to have a temperature equivalent to a glass transition temperature or lower. When a liquid having a large vaporization heat is used without boiling it beforehand, the above taking-up method is preferred in view of an improvement in the yield against the breakage of the glass.

As a liquid, there may be used ethanol or fluoroethanol that is heated such that liquid around the glass is caused to boil by the amount of heat of the glass.

TABLE 2

|  | Ex. 6 | Ex. 7 | Ex. 8 | Ex. 9 | Ex. 10 |
| --- | --- | --- | --- | --- | --- |
| Dropping intervals (msecond) | 200 | 300 | 500 | 1000 | 2000 |
| Nozzle height (mm) | 30 | 300 | 400 | 700 | 1000 |
| Depth of liquefied nitrogen (mm) | 350 | 750 | 750 | 1000 | 1200 |
| Weight of preform (mg) | 2 | 10 | 30 | 250 | 1000 |
| Sphericity (%)* | 0.2 | 2 | 3 | 4 | 5 |
| Surface state of preform | ND** | ND** | ND** | ND** | ND** |

Ex. = Example, *[(major diameter − minor diameter)/(arithmetic mean of major diameter and minor diameter)] × 100, **Not defective Example 11

The preforms obtained in Examples 1 to 10 were softened by re-heating them and precision-press-molded with a mold in a nitrogen atmosphere to produce optical devices such as aspherical lenses, microlenses and the like. The thus-obtained optical devices satisfied required performances. An optical thin film such as an anti-reflection film was formed on each of optical-function surfaces of the optical devices as required.

Example 12

The preforms obtained in Examples 1 to 10 were softened by re-heating them in atmosphere, press-molded and then annealed, to give optical device blanks having a form close to a lens form. These blanks were lapped and polished to complete lenses. An optical multi-layered film such as an anti-reflection film may be formed on each lens surface as required. Immediately after press-molding, the above optical device blanks may be poured into liquefied nitrogen to cool them. When the optical device blanks are cooled as described above, there is found no decrease in the form accuracy of the optical device blanks, and the optical device blanks can be excellently cooled. The above liquefied nitrogen may be replaced with boiling water, or the like.

In the above method, an annealed preform may be barrel-polished and then press-molded.

In Example 11, the optical device blanks obtained by press-molding the preforms were put into liquefied nitrogen or boiling water. However, there may be employed a method in which a molten glass is supplied to a press-molding mold and press-molded while it has a softened state, to form a glass molded article, and the molded article is put into liquefied nitrogen or boiling water to cool it.

EFFECT OF THE INVENTION

According to the present invention, glass article such as preforms for press-molding can be stably and efficiently produced at high yields from a molten glass gob or a molten glass controlled to have a predetermined weight, and glass articles can be stably and efficiently produced at high yields from a glass in a softened state.

Preforms for press-molding, obtained by the process of the present invention, are softened by heating and precision-press-molded, whereby optical devices such as aspherical lenses or microlenses having desired performances can be obtained.

The invention claimed is:

1. A process for the production of a glass article from a molten glass, which comprises putting a molten glass gob formed of a predetermined amount of molten glass having a predetermined weight taken from a molten glass, into a boiling liquid having a boiling point lower than the glass transition temperature of the glass constituting said glass article or a liquid which is temperature-adjusted beforehand so as to be caused to boil by the amount of heat of the glass, to form a glass article having a weight equivalent to said weight, and taking out the glass article.

2. A process for the production of a glass article by molding a glass in a softened state, which comprises press-molding a glass in a soften state to form a glass molded article then cooling said glass molded article in a boiling liquid having a boiling point lower than the glass transition temperature of the glass constituting said glass molded article or a liquid which is temperature-adjusted beforehand so as to be caused to boil by the amount of heat of the glass.

3. The process for the production of a glass article as recited in claim 1, wherein the glass article is a preform for press-molding.

4. A process for the production of a press-molding preform by dropping molten glass, which comprises dropping a molten glass having a predetermined weight from a nozzle, receiving the dropped glass with a liquefied medium obtained by cooling and liquefying a substance that exhibits a gaseous phase state at room temperature under atmospheric pressure, to form a preform having a weight equivalent to said weight, and taking out the preform.

5. A process for the production of an optical device, which comprises heating, softening and press-molding a preform prepared by the process recited in claim 3.

6. The process for the production of an optical device as recited claim 5, wherein a press-molded glass is lapped and polished.

7. The process for the production of a glass article as recited in claim 1, wherein a forward end portion of flow of the molten glass flowing out from a nozzle is received on a support member, and then, the molten glass is cut or separated between the nozzle and the support member, to take the molten glass gob having a predetermined weight.

8. A process for the production of a glass article from a molten glass, which comprises receiving a forward end portion of flow of the molten glass flowing out from a nozzle on a support member, then, cutting or separating the molten glass between the nozzle and the support member, to take the molten glass gob having a predetermined weight, and putting said molten glass gob into a liquid that is caused to boil by the amount of heat of the glass, to form a glass article having a weight equivalent to said weight, and taking out said glass article while the liquid in contact with the glass article is boiling.

9. The process for the production of a glass article as recited in claim 8, wherein said molten glass gob is put into a boiling liquid having a boiling point lower than the glass transition temperature of the glass constituting said glass article or a liquid which is temperature-adjusted beforehand so as to be caused to boil by the amount of heat of the glass.

10. A process for the production of a press-molding perform by shaping the press-molding perform from a molten glass, which comprises receiving a forward end portion of flow of the molten glass flowing out from a nozzle on a support member, then, cutting or separating the molten glass between the nozzle and the support member, to take the molten glass gob having a predetermined weight, receiving said molten glass gob with a liquefied medium obtained by cooling and liquefying a substance that exhibits a gaseous phase state at room temperature under atmospheric pressure, to form the preform having a weight equivalent to said weight, and taking out the preform.

11. The process for the production of an optical device as recited in claim 5, wherein the press-molding is precision press-molding.

* * * * *